US011093954B2

(12) United States Patent
Ray et al.

(10) Patent No.: US 11,093,954 B2
(45) Date of Patent: Aug. 17, 2021

(54) SYSTEM AND METHOD FOR PREDICTING THE SALES BEHAVIOR OF A NEW ITEM

(71) Applicant: Wal-Mart Stores, Inc., Bentonville, AR (US)

(72) Inventors: Shubhankar Ray, Union City, CA (US); Abhay Jha, Burlingame, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 1400 days.

(21) Appl. No.: 14/638,637

(22) Filed: Mar. 4, 2015

(65) Prior Publication Data

US 2016/0260110 A1    Sep. 8, 2016

(51) Int. Cl.
*G06Q 30/02* (2012.01)
*G06Q 10/06* (2012.01)
*G06Q 10/08* (2012.01)

(52) U.S. Cl.
CPC ... *G06Q 30/0202* (2013.01); *G06Q 10/06315* (2013.01); *G06Q 10/087* (2013.01)

(58) Field of Classification Search
None
See application file for complete search history.

(56) References Cited

U.S. PATENT DOCUMENTS

| | | | |
|---|---|---|---|
| 6,151,582 A * | 11/2000 | Huang | G06Q 10/06 705/7.25 |
| 7,092,929 B1 * | 8/2006 | Dvorak | G06Q 10/087 705/28 |
| 7,475,022 B1 * | 1/2009 | Dvorak | G06Q 10/04 705/7.31 |
| 7,480,623 B1 * | 1/2009 | Landvater | G06Q 10/06315 705/7.25 |
| 7,480,640 B1 | 1/2009 | Elad et al. | |
| 8,010,404 B1 * | 8/2011 | Wu | G06Q 30/02 705/1.1 |
| 8,359,164 B2 | 1/2013 | Li | |
| 8,676,632 B1 * | 3/2014 | Watson | G06Q 30/0206 705/1.1 |
| 8,738,421 B1 * | 5/2014 | Ali | G06Q 30/0223 705/28 |

(Continued)

OTHER PUBLICATIONS

Liu et al., "A New Approach to Hierarchical Clustering Using Partial Least Squares", 2006 International Conference on Machine Learning and Cybernetics, pp. 1125-1131, published: Aug. 2006 (Year: 2006).*

*Primary Examiner* — Rutao Wu
*Assistant Examiner* — Sarjit S Bains
(74) *Attorney, Agent, or Firm* — Bryan Cave Leighton Paisner LLP

(57) ABSTRACT

A system and method for forecasting the sales of a new item, i.e., one with no historical sales data, is presented. Two matrices are presented, a feature matrix and a sales matrix. The matrices are divided into training matrices and prediction matrices. The training matrices are decomposed, then regression analysis is performed to determine the weight of various columns of the training feature matrix. Thereafter, the weights could be used on the training prediction matrix to predict sales. The sales predictions can be used to order SKUs for a retailer or distributor. Other embodiments are also disclosed herein.

22 Claims, 5 Drawing Sheets

(56) References Cited

U.S. PATENT DOCUMENTS

| | | | |
|---|---|---|---|
| 2001/0014868 A1* | 8/2001 | Herz | G06Q 30/02 705/14.38 |
| 2002/0107858 A1* | 8/2002 | Lundahl | G06K 9/6247 |
| 2003/0126103 A1* | 7/2003 | Chen | G06Q 10/06 706/50 |
| 2005/0288993 A1* | 12/2005 | Weng | G06Q 10/06 705/7.31 |
| 2008/0288889 A1* | 11/2008 | Hunt | G06Q 30/02 715/810 |
| 2009/0018996 A1* | 1/2009 | Hunt | G06Q 30/02 |
| 2009/0234710 A1* | 9/2009 | Belgaied Hassine | G06Q 30/02 705/7.29 |
| 2010/0169166 A1* | 7/2010 | Bateni | G06Q 30/02 705/7.31 |
| 2010/0268661 A1* | 10/2010 | Levy | G06Q 30/02 705/347 |
| 2011/0004509 A1* | 1/2011 | Wu | G06Q 10/06375 705/7.37 |
| 2011/0071885 A1* | 3/2011 | Ayres de Castro | G06Q 30/02 705/7.31 |
| 2012/0265736 A1* | 10/2012 | Williams | G06F 16/36 707/692 |
| 2013/0036082 A1* | 2/2013 | Natarajan | G06Q 30/00 706/47 |
| 2013/0073337 A1* | 3/2013 | Wu | G06Q 10/04 705/7.31 |
| 2013/0091033 A1* | 4/2013 | Goodman | G06Q 30/0621 705/26.5 |
| 2013/0173330 A1* | 7/2013 | Puskorius | G06Q 10/00 705/7.25 |
| 2014/0067467 A1* | 3/2014 | Rangarajan | G06Q 30/02 705/7.31 |
| 2014/0108094 A1* | 4/2014 | Beddo | G06Q 10/067 705/7.31 |
| 2014/0108359 A1* | 4/2014 | Banaei-Kashani | G06F 11/0745 707/692 |
| 2014/0278778 A1* | 9/2014 | Regan | G06Q 10/04 705/7.31 |
| 2015/0142620 A1* | 5/2015 | Dudziak | G06Q 10/087 705/28 |
| 2017/0011421 A1* | 1/2017 | Fujita | G06Q 30/02 |
| 2017/0220943 A1* | 8/2017 | Duncan | G06F 8/38 |

\* cited by examiner

SYSTEM AND METHOD FOR PREDICTING THE SALES BEHAVIOR OF A NEW ITEM

TECHNICAL FIELD

This disclosure relates generally to forecasting, and relates more particularly to forecasting sales for a new item to be introduced in a retail business.

BACKGROUND

A retail business typically needs to stock items in a warehouse or store in order to sell the items. Storing too few of a particular item can be undesirable because if the item becomes sold out, then the retail business is not able to sell the item until it becomes in stock again. Storing too many of a particular item also can be undesirable because the amount of space in a warehouse or store is finite—storing too many of an item that does not sell takes away space from items that do sell. It would be desirable to have a system that can more accurately forecast the sales of items for a retailer or distributor.

BRIEF DESCRIPTION OF THE DRAWINGS

To facilitate further description of the embodiments, the following drawings are provided in which.

Figure 1:
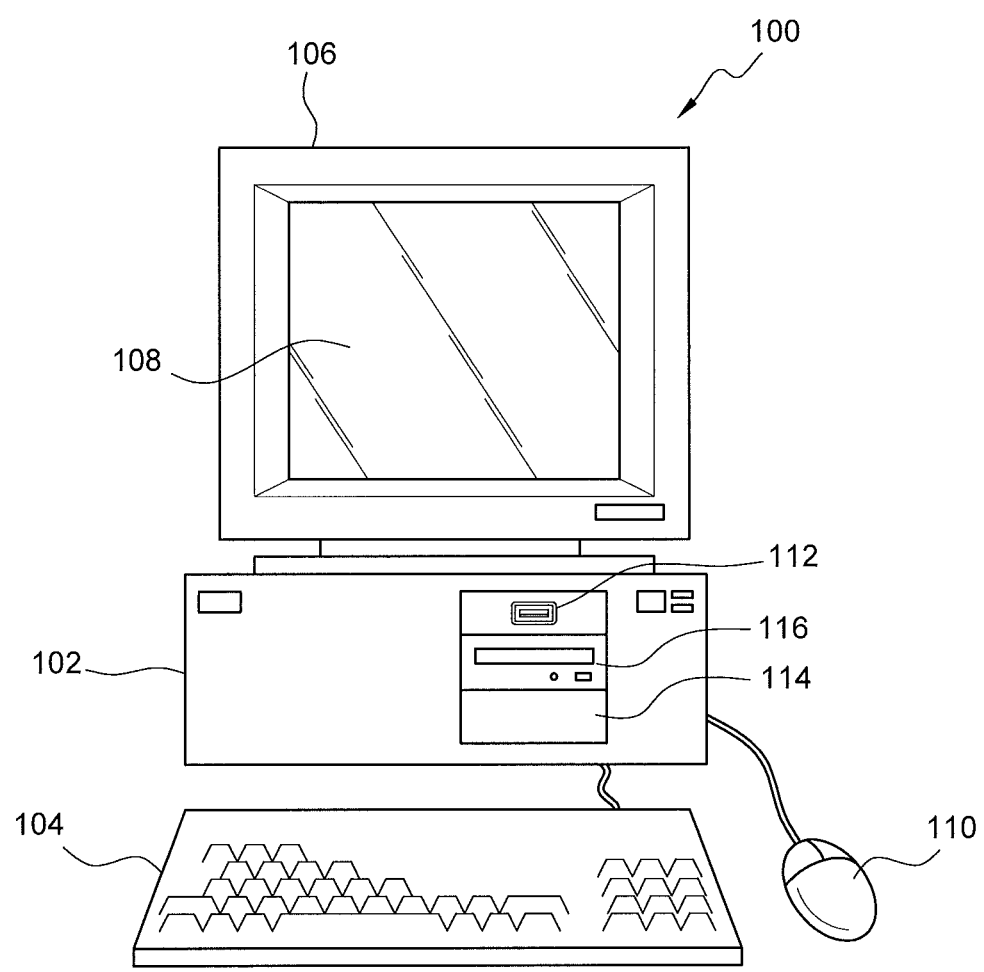
FIG. 1 illustrates a front elevation view of a computer system that is suitable for implementing an embodiment of the system.

For simplicity and clarity of illustration, the drawing figures illustrate the general manner of construction, and descriptions and details of well-known features and techniques might be omitted to avoid unnecessarily obscuring the present disclosure. Additionally, elements in the drawing figures are not necessarily drawn to scale. For example, the dimensions of some of the elements in the figures might be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but might include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements can be electrically coupled together, but not be mechanically or otherwise coupled together. Coupling can be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

In one embodiment, a method can comprise: receiving a first matrix including feature information for a plurality of stock keeping units (SKUs), each row of the first matrix containing information about a single SKU; receiving a second matrix including sales information for the plurality of SKUs, each row of the second matrix containing information about a single SKU; dividing the first matrix into a first subset of the first matrix and a second subset of the first matrix, based on the second matrix; decomposing the first subset of the first matrix to find weights for various features in the first subset of the first matrix, the weights representing a relative importance of each such feature; using the weights of the first subset of the first matrix to predict sales of SKUs that are located in the second subset of the first matrix; and ordering inventory based on the sales predictions of SKUs that are located in the second subset of the first matrix.

In one embodiment, a system can comprise: a user input device; a display device; one or more processing modules; and one or more non-transitory storage modules storing computing instructions configured to run on the one or more processing modules and perform the acts of: receiving a first matrix including feature information for a plurality of stock keeping units (SKUs), each row of the first matrix containing information about a single SKU; receiving a second matrix including sales information for the plurality of SKUs, each row of the second matrix containing information about a single SKU; dividing the first matrix into a first subset of the first matrix and a second subset of the first matrix, based on the second matrix; decomposing the first subset of the first matrix to find weights for various features in the first subset of the first matrix, the weights representing a relative importance of each such feature; using the weights of the first subset of the first matrix to predict sales of SKUs that are located in the second subset of the first matrix; and ordering inventory based on the sales predictions of SKUs that are located in the second subset of the first matrix.

Figure 2:
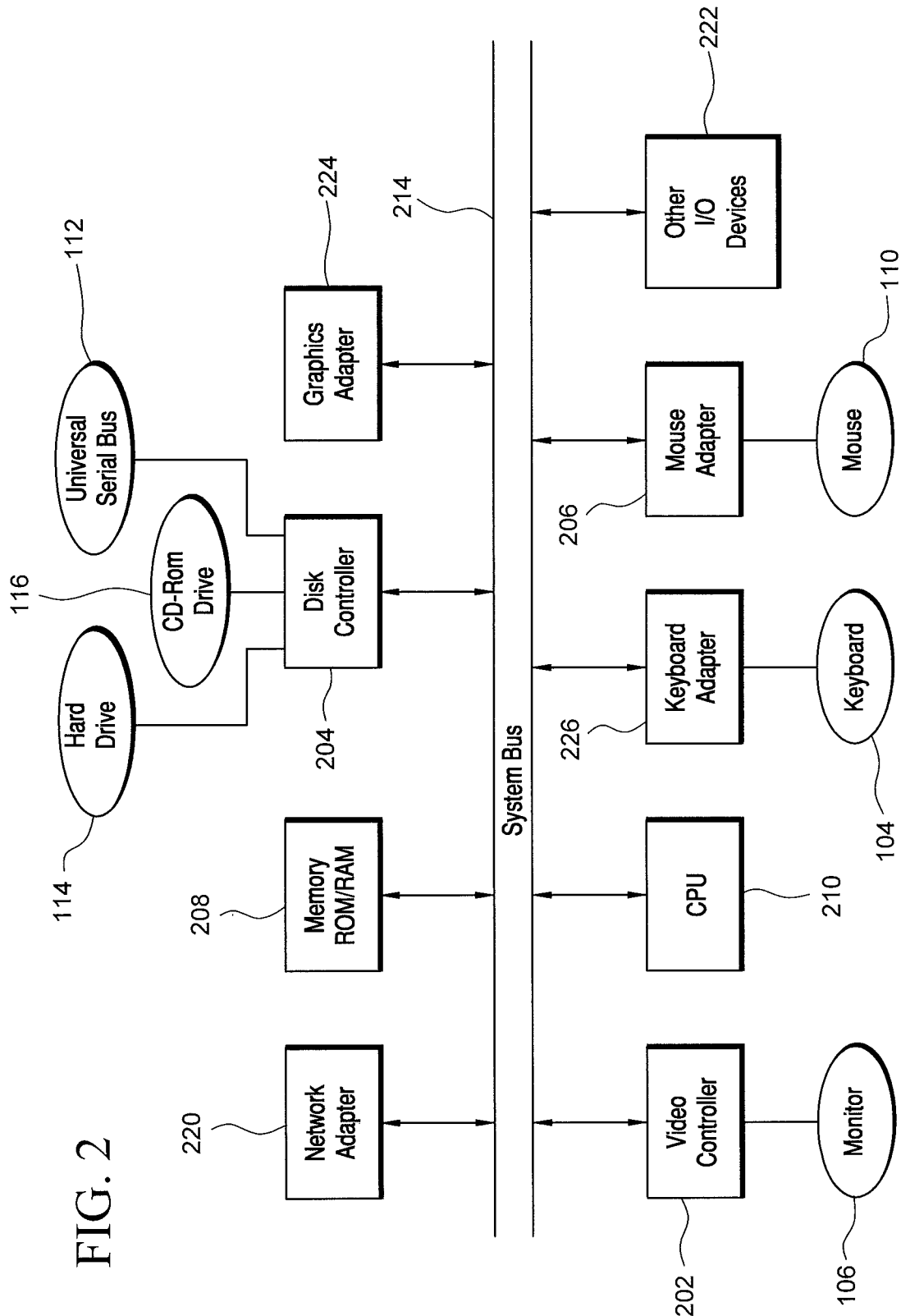
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for implementing the techniques described herein. As an example, a different or separate one of a chassis 102 (and its internal components) can be suitable for implementing the techniques described herein. Furthermore, one or more elements of computer system 100 (e.g., a refreshing monitor 106, a keyboard 104, and/or a mouse 110, etc.) also can be appropriate for implementing the techniques described herein. Computer system 100 comprises chassis 102 containing one or more circuit boards (not shown), a Universal Serial Bus (USB) port 112, a Compact Disc Read-Only Memory (CD-ROM), Digital Video Disc (DVD) drive, or Blu-ray drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 comprises both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can comprise microcode such as a Basic Input-Output System (BIOS) or Unified Extensible Firmware Interface (UEFI). In some examples, the one or more memory storage units of the various embodiments disclosed herein can comprise memory storage unit 208, a USB-equipped electronic device, such as, an external memory storage unit (not shown) coupled to universal serial bus (USB) port 112 (FIGS. 1-2); hard drive 114 (FIGS. 1-2), and/or CD-ROM, DVD drive, or Blu-ray drive 116 (FIGS. 1-2). In the same or different examples, the one or more memory storage units of the various embodiments disclosed herein can comprise an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Some examples of common operating systems can comprise various versions/distributions of Microsoft® Windows® operating system (OS), Apple® OS X, UNIX® OS, and Linux® OS.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 and the circuit boards inside chassis 102 (FIG. 1) are not discussed herein.

When computer system 100 in FIG. 1 is running, program instructions stored on a USB-equipped electronic device connected to USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out at least part of the techniques described herein.

Although computer system 100 is illustrated as a desktop computer in FIG. 1, there can be examples where computer system 100 can take a different form factor while still having functional elements similar to those described for computer system 100. In some embodiments, computer system 100 can comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 can comprise a portable computer, such as a laptop computer. In certain other embodiments, computer system 100 can comprise a mobile device, such as a smart phone or a tablet. In certain additional embodiments, computer system 100 can comprise an embedded system. It should also be understood that a particular configuration of computer system 100 might or might not contain each of the items shown in FIG. 1 or 2 or might in fact contain multiple of each of the items shown in FIG. 1 or 2. For example, certain implementations of computer system 100 might not contain a CD-ROM, DVD, or Blu-ray drive 116. Other implementations of computer system 100 might contain two CD-ROM, DVD, or Blu-ray drives 116. Other implementations of computer system 100 can contain 2 or more monitors 106. Other implementations of computer system 100 could contain no monitors. Other implementations of computer system 100 can contain equivalents to certain items. For example, hard drive 114 can be replaced or augmented by a solid-state drive (SSD). Computer system 100 could be a special-purpose machine, such as a set-top box or video game console. In other embodiments, computer system 100 can be a general-purpose computer.

Forecasting is a key problem encountered in inventory planning. In order to buy inventory in advance, retailers or distributors would like an estimate of the number of units a distinct item for sale (also known as a stock keeping unit or a "SKU") is going to sell in a certain time period. Buying fewer units than is needed leads to lost sales opportunities, hence lower revenue, because items that could have been sold were not in stock. Buying too many units also might lead to lost sales opportunities because the cost of buying the unused inventory might not be compensated by income from sales to customers and can lead to lost opportunity costs (e.g., items that do not sell occupying space in a warehouse or store in place of items that could have been sold).

In general, a retailer wants to forecast the number of units it will sell so it can accurately purchase the units on a timely basis. One method of forecasting examines past sales of an item. Past sales can reveal both local level and seasonal patterns. Local level patterns refers to sales in the recent past, as sales of a certain SKU in the recent past can be important in forecasting future sales. Seasonality refers to periodic events that can influence sales. Seasonality can refer both to general seasonality (e.g., sales are higher during the autumn because of the holiday season), and to product seasonality (some products are generally used only during certain times of the year.) For example, swimwear might be more popular in the summer, while Christmas decorations are more popular in the fall and winter.

Figure 4A:
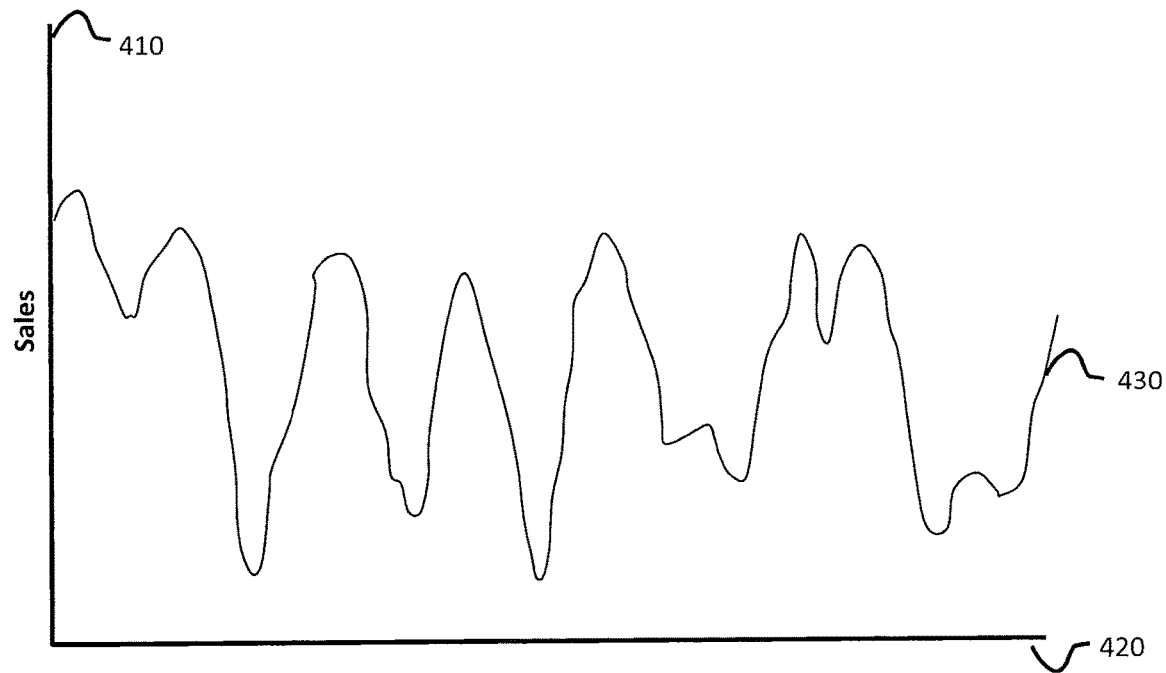
FIGS. 4A-4B illustrate an exemplary sales graph of a stock keeping unit.

With reference to FIG. 4A, a graph illustrating the sales of an exemplary product is illustrated. X-axis 420 is the time period for the sales. For example, FIG. 4A could be an annual graph, and each time period is weekly sales. In another embodiment, FIG. 4A could be a multi-year graph, and each time period could be monthly sales. Other combinations are also possible.

Y-axis 410 is the range of values for sales. Data series 430 represents the sales for each time period represented by X-axis 420. Y-axis 410 can be in a variety of different formats. In some embodiments, Y-axis 410 can represent actual sales. In some embodiments, Y-axis 410 can represent sales rankings. Using rankings as opposed to actual sales can result in more reliable and accurate data in some embodiments. For modeling purposes, two time-series can be considered similar if they rise and fall in unison. A rank correlation metric such as a Pearson correlation or a Spearman correlation can be used to measure similarity between time-series. For display purposes, Y-axis 410 can be linear or logarithmic.

As described above, a retailer would take data such as that illustrated in FIG. 4A and use the data to predict future sales. If the graph is relatively periodic, the retailer can forecast that more of the sales would occur during a certain time of the year and that fewer sales would occur during other times of the year. A few situations can occur that can make the use of such data to predict future sales difficult for some SKUs. For example, a possible situation can occur with electronic commerce ("eCommerce") retailers. Because eCommerce retailers generally store more SKUs than brick and mortar stores, there might not be enough sales data to model each SKU separately. In addition, eCommerce retailers often stock SKUs that are short-lived or have erratic data. For example, some eCommerce retailers have SKUs that sell out quickly, and there exists a time period where there is no data. In addition, there are SKUs that are short-lived, and thus there might not be available seasonal data from a previous year. Exemplary short-lived SKUs can include clothing (because of fashion trends, some items of clothing are sold only for a single season) and electronics (some forms of electronics, such as cell phone and TVs, are updated regularly, so a particular SKU might not have existed a year ago.)

Figure 4B:
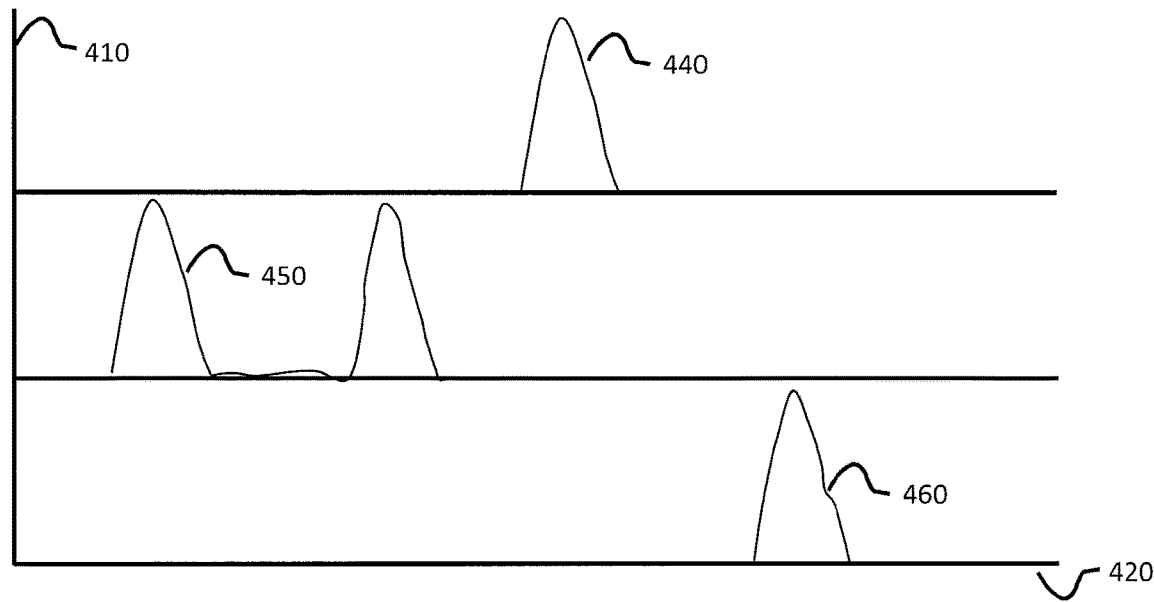

FIG. 4B illustrates three different SKUs that have such situations. The same X-axis 420 and Y-axis 410 that are used in FIG. 4A also are present in FIG. 4B. Data series 440, data series 450, and data series 460 represent the sales of three different items. Data series 440 has incomplete data. Sales are present only for a very short time period, with no sales before or after that time period. This type of data series can be indicative of a short-lived item. Because the item had sales for only a very short-period of time, a popular but short-lived item might be indicative of a product that is no longer made. Data series 450 has two sales spikes, with a period of zero or otherwise low sales in between the sales spikes. Such a data series might be indicative of an item that could not keep up with demand (between the two spikes), and is no longer being made. Or such a data series might be indicative of a seasonal item (explaining the sales spikes) that is no longer being made (explaining the lack of data after the second sales spike). Data series 460 is similar to data series 440 in that it has only a single spike. However, while data series 440 is similar to data series 430 in that a peak for data series 430 roughly coincides with a peak of data series 440, data series 460 has a peak that roughly coincides with a trough of data series 430. This fact can indicate both that the item in data series 460 is a short-lived item and that its sales do not correlate well with the item represented by data series 430. This type of behavior is discussed in further detail below.

One method of solving the above problems is to forecast items in groups (also known as clusters). In other words, instead of forecasting what each individual SKU will sell, one would place a SKU in a group with other SKUs. Then, one forecasts what the group of SKUs would sell. Data series 430, data series 440, and data series 450 could be forecast as a group. The forecast could then be used to order the proper number of items for each of the three SKUs. While there are currently existing methods and systems for grouping SKUs, it would be desirable to have a more accurate method and system of grouping SKUs for forecasting purposes.

There are several limitations on groups of SKUs that may be implemented. There might be both a lower-bound and an upper-bound on the number of SKUs in a group. A lower-bound can be desirable because too few SKUs in a group can result in one SKU adversely affecting the forecasting model by having a very large influence on a group. Too many SKUs in a group can be too large to compute efficiently. In some embodiments, an upper-bound is set at 200 SKUs per group. Too few SKUs in a group can result in an unreliable metric.

Another problem that can occur with grouping is the difficulty of finding a group for new items. New items are SKUs that have no prior sales data. A SKU with partial sales data can be compared with other SKUs. But a SKU with no sales data cannot be compared to the sales data of other SKUs because a brand new SKU has no sales data at all. Therefore, finding a group for a new SKU using the above methods can be difficult.

A common approach for grouping SKUs with no prior sales data is to group the SKU using semantic data about the SKU. Semantic data about an item includes, for example, the name, description, brand, price, and the like. For example, there may be a new 60-inch Samsung LED TV that is being released. Because there is no prior sales data for this particular 60-inch Samsung LED TV, one would have to group this SKU with other SKUs to estimate sales data for this product. A problem with this approach is that one might not know which semantic data is most relevant to a new SKU. Returning to the 60-inch Samsung LED TV, one might not know which feature of the new SKU is most important— the size (will it sell like other 60" TVs), the brand (will it sell like other Samsung TVs), the price (will it sell like cheaper TVs or more expensive TVs) or the style (will it sell like other LED TVs or can you include LCD TVs). There might be one feature that takes precedence of others or the combination of all the features with some weighting that best predicts the performance of this new SKU. It has been found that previous methods of using semantic data to group SKUs for prediction purposes has not been very successful. A new method of using semantic data to group SKUs is desired.

Mathematically speaking, the problems to be solved can be expressed using matrix mathematics. Let Matrix Y be an n×m matrix containing information about sales per time period. This can be termed panel data. There are n rows $Y_i$, each with a length m. Each row represents data about a certain SKU. Each column can represent sales data for a certain time period. The time periods can be a variety of different time periods. In some embodiments, the time period is a day. In some embodiments, the time period is a week (thus, each column would represent the sales of a particular week for each item). In some embodiments, the time period is a month. Any time period can be chosen.

In some embodiments, the sales data can be rank data as opposed to actual sales. In other words, actual sales can have the number of units moved in a particular time period, such as $\{10, 35, 11, 20\}$. Ranked data would rank the sales, so the same data could be represented as $\{4, 1, 3, 2\}$ (or $\{1, 4, 2, 3\}$, if the ranks are ascending instead of descending.) An advantage of using ranked vectors is that ranked vectors captures the intuitive definition of "rising" and "falling" in unison better.

Let Matrix X be an n×l semantic feature matrix. The n rows each represent data about a certain SKU (as with matrix Y). The l columns each represent features of each SKU, such as item description, brand, category, price, color and the like. Matrix X is typically constructed using Information Retrieval (IR) methods. To get similarity, the popular IR methods of cosine similarity and Latent Semantic Indexing (LSI) can be used.

In LSI, the principal (or most important) components of semantic feature matrix X are summarized. The principal components are those top directions of the semantic matrix that have the highest variance. Because semantic feature matrix X is sparse and high-dimensional, a low-rank decomposition of X can be used instead of the entire matrix. The top few singular vectors of X can be thought of as latent directions which are most informative, thus leading to the term: "Latent Semantic Indexing."

LSI is a special case of dimension reduction techniques where one embeds a feature space (such as matrix X) in a low-dimensional space so that the distance between the objects in low-dimensional space approximates the distance between the objects in its original, high-dimensional feature space. In addition to performing LSI on the matrix X, one could also construct an embedding matrix $Y_e$ for sales data Y for the items with sufficient sales data. For other items, one can seek to find the coordinates in this space based on X. This can be formulated in a regression framework linking $Y_e$ with X. Solving this regression can be difficult because feature matrix X is sparse and possibly collinear. So using a regression model such as ordinary least squares (OLS) might not be effective. One might consider using an approach like principal component regression (PCR), where the regression is performed using the top principal components of X. A limitation of this is that, while the top principal components may explain X successfully, but don't take $Y_e$ (the embedding matrix of Y for items with sufficient sales data) into account.

LSI summarizes the feature matrix X by its principal components—the top directions in which this matrix has highest variance. However, LSI does not use any other information to find the principal components. An embodiment uses the sales matrix Y in addition to the feature matrix X. In addition to finding the principal components by finding the highest variance, one also find the maximum covariance with sales matrix $Y_e$. Thus, the result is finding the semantic features that have maximal variance and correlation with sales. One finds the principal components during training on a set of items with enough sales. Thereafter, one can use the found principal components to predict for items that have little or no prior sales data.

An embodiment combines the semantic feature X with the sales matrix Y to find the covariance between the matrices. Instead of using principal components of X, it uses directions that explain the covariance of X and $Y_e$ well. Thereafter, the features that most influence sales can be determined. When a new SKU with no sales data is presented, the features that most influence sales can be used to determine a cluster in which the new SKU can be placed.

An embodiment can use Partial Least Squares (PLS). PLS is similar to PCR, except that the principal components are chosen not just to maximize the variance of X, but also the correlation with $Y_e$.

To find the principal components of sales matrix Y, the rows of matrix Y are centered, such that each row sums to zero. This enables one to compute a covariance matrix with simple matrix multiplication. The matrix is decomposed as follows:

$$Y = \sum_{i=1}^{r} t_i p_i^T + E$$
$$= TP^T + E$$

Where P is orthonormal. In other words, there is a sum of r rank 1 matrices and a residual E. R is less than the rank of Y. Matrix T is referred to as the "scores," and matrix P is referred to as the "loadings." The decomposition is unique for a given r: P are the top r unit eigenvectors of $Y^TY$ and T are the projections of Y along those directions. In other words T=YP. P gives us the r-dimensional space, while T gives us the projections of Y in that space. In general, one might only be interested in the scores T. The scores can be determined as follows:

$$t_m = \max_v \text{Var}(Y_v)$$

$$s.t. \|v\|=1, \text{Cov}(t_m, t_i)=0, 1 \le i \le m-1$$

In this equation, $t_1$ is the variance along the vector of maximum sales covariance. And $t_i$ gives us the maximum possible variance along any vector, while being uncorrelated with $t_1 \ldots t_{i-1}$. Together, P gives us a space that explains as much variance as possible in r dimensions.

A goal can be to use the coordinates Y of this space T, as a low-dimensional embedding. The property of this embedding that is most relevant to us is the following: For any rank r matrix Λ:

$$\|XX^T - TT^T\| \le \|XX^T - \Lambda\Lambda^T\|$$

$XX^T$ is the covariance matrix of the item sales. Thus, T gives its an embedding in dimension r that approximates this matrix.

The problem of predicting the sales of items with little or no sales history can then be re-formulated as follows: Divide X into $X_{train}$ and $X_{predict}$, where $X_{train}$ is the items for which we have sales in Y and $X_{predict}$ are the remaining items. Fix r, and find the principal component scores for Y:T. Since distance in this space approximates sales well, it is sufficient if we can predict the coordinates in this space for the items with no sales. Hence our problem can be reformulated as a regression problem of T against $X_{train}$. The value r can be chosen using cross-validation.

The regression can be expressed in the form Y=XB+F. There are several problems that can be encountered when attempting to solve that regression. For one, it is a multi-dimensional regression. For another, the dimension may be large in some instances. An Ordinary Least Squares (OLS) estimate B is $B=(X^TX)^{-1}X^TY$.

In this case, X is high-dimensional and sparse (i.e., there are a lot of null values in feature matrix X). Thus, OLS generally fails because of the presence of collinear columns in X, which render ($X^TX$) non-invertible.

There are several techniques that can be used to deal with such problems. Two common one are "lasso" and "ridge." In these two techniques, the linear regression is solved subject to an upper bound on the L1 and L2 norms of B respectively. Lasso gives a very sparse estimate of B, hence many of the tokens might have no influence at all. Ridge, on the other hand, shrinks the coefficients so that the correlated tokens will have similar weights. Since X in our case is a very sparse semantic matrix (because there can be many fields for features that are not applicable to some products, e.g., fields for color and size might not applicable to cameras) which, in practice, is generally summarized by its principal components, it might also make sense to try Principal Component Regression (PCR), which is the regression of Y against principal components of X. However, none of the above-discussed techniques are found to be efficient enough.

An embodiment uses the technique of Partial Least Squares (PLS). PLS is similar to PCR, except that the principal components are chosen not just to maximize the variance of X, but also the correlation with Y. For the sake of exposition, we can assume that Y=y is univariate. The algorithm can be described in a similar manner to the PCA described above.

Using a similar procedure to that described above, X can be decomposed as follows:

$$X = TP^T + E$$

Here, the components of T are chosen to maximize both the variance of X and its correlation with y:

$$t_m = \max_v \text{Corr}^2(y, Xv) \text{Var}(Xv)$$

Where $\|v\|=1$, $\text{Cov}(t_m, t_i)=0$; $1 \le i \le m-1$
Then, you regress y on T to get $$y = TC + F$$

Because T is in the span of X, one can express T=XW, which gives $$y = XWC + F$$

The results can thus be expressed in terms of X. Each column in X represents weights of each feature of each SKU. Thus, the principal components of the feature matrix can be determined.

The principal components are predicted instead of the sales matrix for several reasons. For example, the main hindrance to predicting the sales matrix is the inordinate amount of NA in the sales matrix. Even though the NIPALS, algorithm, used for solving PLS, can work with NA, its performance would severely degrade.

Figure 3:
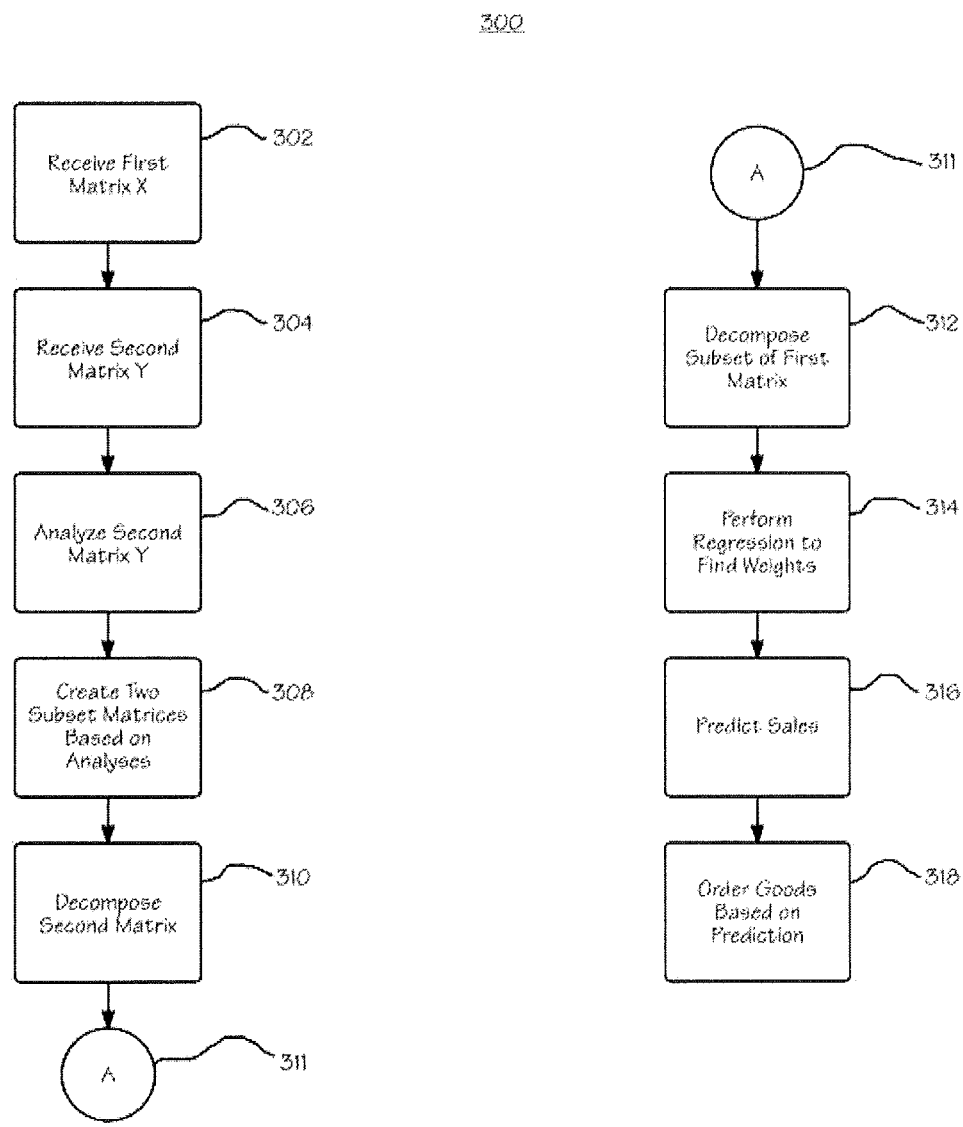
FIG. 3 is a flowchart illustrating the operation of a method of predicting sales behavior of an item with a limited history of sales data.

With reference to FIG. 3, a flowchart illustrating the operation of a method 300 of determining principal components of a matrix is presented. Method 300 is merely exemplary and is not limited to the embodiments presented herein. Method 300 can be employed in many different embodiments or examples not specifically depicted or described herein. In some embodiments, the procedures, the processes and/or the activities of method 300 can be performed in the order presented. In other embodiments, the procedures, the processes, and/or the activities of method 300 can be performed in any other suitable order. In still other embodiments, one or more of the procedures, the processes, and/or the activities of method 300 can be combined or skipped. In some embodiments, method 300 can be implemented by computer system 100 (FIG. 1).

A matrix X (also known as a first matrix) containing a set of one or more items and features associated with the one or more SKUs is presented to an embodiment (block 302). As described above, matrix X would typically contain a plurality of rows and columns. Each row contains data for a single SKU. One column of the data might contain a unique identifier for each SKU. The remaining columns of the matrix contain semantic data that can describe the SKU. For example, the information can include name, category, price, description, color, first date of sale, and additional information about each SKU.

A matrix Y (also known as a second matrix) containing a set of one or more SKUs and sales data associated with the one or more SKUs also is presented to an embodiment (block 304). As described above, matrix Y would typically contain a plurality of rows and columns. Each row contains data for a single SKU. One column of the data might contain a unique identifier for each SKU. The remaining columns of the matrix contain information that can describe sales data of the SKU for a particular time period. In some embodiments, the sales data can represent the number of items sold of the SKU. In some embodiments, a rank of the sales data can placed in matrix Y.

Matrix X and matrix Y can be created by an embodiment. For example, data regarding each SKU, including semantic feature data and sales data, can be presented to an embodiment. Thereafter, a row for each SKU is created in matrix X and matrix Y. Semantic feature data for each SKU is placed in matrix X, and sales data for each SKU is placed in matrix Y.

Matrix X and matrix Y are compared to determine a first subset of SKUs that represent the items for which there is sales data and a second subset of SKUs for which predictions are desired (block 306). Because matrix X and matrix Y ideally contain the same SKUs, such a separation can be performed relatively easily. For example, the matrix Y can be examined, and any SKU with greater than a threshold number of non-zero sales data can be noted. Block 306 occurs after block 304, but the other sequences of blocks 302, 304, and 306 can vary.

Matrix X can be divided into two different matrices: a training matrix X and a prediction matrix X (block 308). Training matrix X can contain the SKUs for which there is greater than a threshold number of non-zero sales data. Prediction matrix X can contain the remaining SKUs.

Sales matrix Y is decomposed (block 310). In other words, sales matrix Y is factorized into a product of matrices. Training matrix X is decomposed (block 312). (Connector block 311 is for illustrative purposes and only serves to connect block 310 with block 312.) This decomposition is into a scores matrix T and a loadings matrix P. The decomposition is geared towards finding a scores matrix T that maximizes the variance of training matrix X and the correlation with matrix Y. The sequences of blocks 310 and 312 can be reversed. Thereafter, a regression is performed on matrix T to find weights for each feature (or component) (block 314). The regression can be a partial least squares (PLS) regression.

Thereafter, the set of weightings of training matrix X are applied to prediction matrix X to predict the sales of the SKUs located in prediction matrix X (block 316). Those predictions can be used to order goods for the SKUs located in prediction matrix X (block 318). The predictions can be made in a variety of different manners. For example, once the weightings of prediction matrix X are determined, an embodiment can use various forecasting techniques and procedures to forecast the sales of new SKUs based on how similar SKUs have performed, with "similarity" being determined by the weights of the feature matrix X as applied to the new SKUs. In other words, the new SKUs can be analyzed to find similar SKUs by using the weightings. Thereafter, the sales data of the similar SKUs can be used to create a prediction of the sales of the new SKUs.

In other embodiments, the new SKUs can be placed in clusters based on the weightings. The clusters will thus have a mixture of SKUs with prior sales data and new SKUs with little or no prior sales data. The clusters can then be used to makes time series predictions. The SKUs in a cluster can be forecasted to behave in a similar manner. Thus, the new SKUs are placed in a cluster based on similar older SKUs, with similarity determined based on semantics of the feature matrix.

Figure 5:
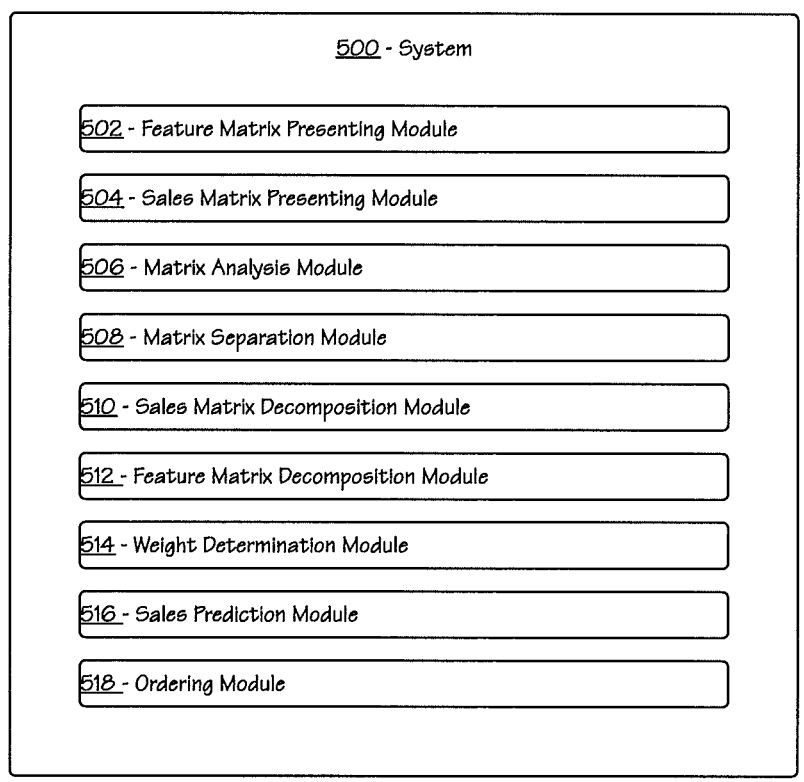
FIG. 5 is a block diagram illustrating a system capable of performing a method of predicting sales behavior of an item with a limited history of sales data.

Turning ahead in the figures, FIG. 5 illustrates a block diagram of a system 500 that is capable of performing disclosed embodiments. System 500 is merely exemplary and is not limited to the embodiments presented herein. System 500 can be employed in many different embodiments or examples not specifically depicted or described herein. In some embodiments, certain elements or modules of system 500 can perform various procedures, processes, and/or acts. In other embodiments, the procedures, processes, and/or acts can be performed by other suitable elements or modules.

In a number of embodiments, system 500 can include feature matrix presenting module 502. In certain embodiments, feature matrix presenting module 502 can perform block 302 (FIG. 3) of presenting a feature matrix.

In a number of embodiments, system 500 can include sales matrix presenting module 504. In certain embodiments, sales matrix presenting module 504 can perform block 304 (FIG. 3) of presenting a sales matrix.

System 500 can include matrix analysis module 506. In certain embodiments, matrix analysis module 506 can perform block 306 of analyzing matrices to find rows that contain sales data.

System 500 can include matrix separation module 508. In certain embodiments, matrix separation module 508 can perform block 308 of separating the matrices into a training matrix and a prediction matrix.

System 500 can include sales matrix decomposition module 510. In certain embodiments, sales matrix decomposition module 510 can perform block 310 of performing a decomposition of a sales matrix.

System 500 can include feature matrix decomposition module 512. In certain embodiments, feature matrix decomposition module 512 can perform block 312 of performing a decomposition of a feature matrix.

System 500 can include weight determination module 514. In certain embodiments, weight determination module 514 can perform block 314 of determining the weights for each component.

System 500 can include sales prediction module 516. In certain embodiments, sales prediction module 516 can perform block 316 of predicting sales of SKUs.

System 500 can include ordering module 518. In certain embodiments, ordering module 516 can perform block 316 of using predictions to order SKUs.

Although the above embodiments have been described with reference to specific embodiments, it will be understood by those skilled in the art that various changes can be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-5 can be modified, and that the foregoing discussion of certain of these embodiments does not necessarily represent a complete description of all possible embodiments. For example, one or more of the procedures, processes, or activities of FIGS. 1-5 can include different procedures, processes, and/or activities and be performed by many different modules, in many different orders.

Replacement of one or more claimed elements constitutes reconstruction and not repair. Additionally, benefits, other advantages, and solutions to problems have been described with regard to specific embodiments. The benefits, advantages, solutions to problems, and any element or elements that can cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A method implemented via execution of computing instructions configured to run at one or more processors and configured to be stored at non-transitory computer-readable media, the method comprising:
   receiving, via execution of the computing instructions, a feature matrix including feature information for a plurality of stock keeping units (SKUs), each row of the feature matrix containing information about a respective one of the plurality of SKUs and the feature information comprising a respective description of a respective product represented by the respective one of the plurality of SKUs;
   storing, via execution of the computing instructions, the feature matrix in the non-transitory computer-readable media;
   receiving, via execution of the computing instructions, a sales matrix including sales information for the plurality of SKUs, each row of the sales matrix containing respective sale information about the respective one of the plurality of SKUs;
   storing, via execution of the computing instructions, the sales matrix in the non-transitory computer-readable media;
   creating, via execution of the computing instructions, a training matrix of the sales matrix;
   dividing, via execution of the computing instructions, the feature matrix, as stored in the non-transitory computer-readable media, into a training subset of the feature matrix and a predictive subset of the feature matrix, based on the sales matrix;
   decomposing the training subset of the feature matrix, via execution of the computing instructions, into a scores matrix, wherein decomposing the training subset of the feature matrix comprises using a set of equations comprising:

$t_m = \max_v \mathrm{Corr}^2(y, Xv) \mathrm{Var}(Xv)$, where:

$\|v\|=1, \mathrm{Cov}(t_m t_i)=0$;

$1 \le i \le m-1$;

y comprises the training subset of the feature matrix;
   X comprises the training matrix of the sales matrix; and
   $t_i$ comprises a maximum variance;
   performing, via execution of the computing instructions, a partial least squares regression on the scores matrix to find at least one respective weight for at least one respective feature in the feature information in the scores matrix of the training subset of the feature matrix, wherein:
      the at least one respective weight represents a relative importance of the at least one respective feature; and
      the partial least squares regression operates as a function of (1) the training subset of the feature matrix, (2) the training matrix of the sales matrix, and (3) the maximum variance;
   choosing, via execution of the computing instructions, one or more weights of the at least one respective weight for the at least one respective feature, the one or more weights created using:
      a respective feature of the at least one respective feature having a maximized correlation with entries in the sales matrix;
   storing, via execution of the computing instructions, the one or more weights of the at least one respective weight in the non-transitory computer-readable media;
   using, via execution of the computing instructions, the one or more weights of the at least one respective weight of the training subset of the feature matrix, as stored in the non-transitory computer-readable media, to create sales predictions for groups of similar SKUs of the plurality of SKUs that are located in the predictive subset of the feature matrix; and
   automatically ordering, via execution of the computing instructions, inventory based on the sales predictions of the plurality of SKUs that are located in the predictive subset of the feature matrix.

2. The method of claim 1 wherein:
   creating the training matrix of the sales matrix comprises:
      for each row in the sales matrix, marking a row of the sales matrix when there are greater than a threshold number of non-zero sales data for the row of the sales matrix; and
      creating the training matrix from all marked rows of the sales matrix; and
   dividing the feature matrix, as stored in the non-transitory computer-readable media, into the training subset of the feature matrix and the predictive subset of the feature matrix, based on the sales matrix, comprises:
      creating the training subset of the feature matrix by:
         matching at least one SKU of the training matrix with a row in the feature matrix; and
         placing the at least one SKU, as matched, in the training subset of the feature matrix; and
      creating the predictive subset of the feature matrix by placing each SKU in the feature matrix that is not in the training subset of the feature matrix into the predictive subset of the feature matrix.

3. The method of claim 1 wherein:
   decomposing the training subset of the feature matrix into the scores matrix comprises:
      decomposing the training subset of the feature matrix into the scores matrix and a loading matrix;
   the scores matrix is configured to have a maximized variance; and
   the scores matrix comprises the at least one respective weight for the at least one respective feature in the feature information in the training subset of the feature matrix.

4. The method of claim 1 wherein:
   the scores matrix is configured to have a maximized correlation with the sales matrix.

5. The method of claim 1 wherein:
   using the one or more weights of the at least one respective weight of the training subset of the feature matrix, as stored in the non-transitory computer-readable media, to create the sales predictions for the groups of the similar SKUs of the plurality of SKUs that are located in the predictive subset of the feature matrix comprises:
      using the one or more weights of the at least one respective weight of the training subset of the feature matrix, as stored in the non-transitory computer-readable media, to determine the one or more weights of the at least one respective weight for the predictive subset of the feature matrix;
      using the one or more weights of the at least one respective weight for the predictive subset of the feature matrix, as stored in the non-transitory computer-readable media, to find the similar SKUs in the training subset of the feature matrix; and
      using sales data from the sales matrix for the similar SKUs to predict sales of the similar SKUs.

6. The method of claim 1 wherein:
receiving the feature matrix comprises:
   receiving data regarding the plurality of SKUs;
   placing a respective unique identifier for each SKU of the feature matrix in the rows of the feature matrix; and
   placing semantic information corresponding to each SKU of the feature matrix in columns of the feature matrix; and
receiving the sales matrix comprises:
   receiving data regarding the plurality of SKUs;
   placing a respective unique identifier for each SKU of the sales matrix in the rows of the sales matrix; and
   placing sales information corresponding to each SKU of the sales matrix in columns of the sales matrix.

7. The method of claim 6 wherein:
each row in the feature matrix has a corresponding row in the sales matrix.

8. A system comprising:
a user input device;
a display device;
one or more processors; and
non-transitory computer readable media storing computing, instructions configured to run on the one or more processors and perform:
   receiving, via execution of the computing instructions, a feature matrix including feature information for a plurality of stock keeping units (SKUs), each row of the feature matrix containing information about a respective one of the plurality of SKUs and the feature information comprising a respective description of a respective product represented by the respective one of the plurality of SKUs;
   storing, via execution of the computing instructions, the feature matrix in the non-transitory computer-readable media;
   receiving, via execution of the computing instructions, a sales matrix including sales information for the plurality of SKUs, each row of the sales matrix containing respective sale information about the respective one of the plurality of SKUs;
   storing, via execution of the computing instructions, the sales matrix in the non-transitory computer-readable media;
   creating, via execution of the computing instructions, a training matrix of the sales matrix;
   dividing, via execution of the computing instructions, the feature matrix, as stored in the non-transitory computer-readable media, into a training subset of the feature matrix and a predictive subset of the feature matrix, based on the sales matrix;
   decomposing the training subset of the feature matrix, via execution of the computing instructions, into a scores matrix, wherein decomposing the training subset of the feature matrix comprises using a set of equations comprising:

$t_m = \max_v \text{Corr}^2(y, Xv) \text{Var}(Xv)$, where:

$\|v\|=1, \text{Cov}(t_m t_i)=0$;

$1 \leq i \leq = m-1$;

y comprises the training subset of the feature matrix;
   X comprises the training matrix of the sales matrix; and
   $t_i$ comprises a maximum variance;
   performing, via execution of the computing instructions, a partial least squares regression on the scores matrix to find at least one respective weight for at least one respective feature in the feature information in the scores matrix of the training subset of the feature matrix, wherein:
     the at least one respective weight represents a relative importance of the at least one respective feature; and
     the partial least squares regression operates as a function of (1) the training subset of the feature matrix, (2) the training matrix of the sales matrix, and (3) the maximum variance;
   choosing, via execution of the computing instructions, one or more weights of the at least one respective weight for the at least one respective feature, the one or more weights created using:
     a respective feature of the at least one respective feature having a maximized correlation with entries in the sales matrix;
   storing, via execution of the computing instructions, the one or more weights of the at least one respective weight in the non-transitory computer-readable media;
   using, via execution of the computing instructions, the one or more weights of the at least one respective weight of the training subset of the feature matrix, as stored in the non-transitory computer-readable media, to create sales predictions for groups of similar SKUs of the plurality of SKUs that are located in the predictive subset of the feature matrix; and
   automatically ordering, via execution of the computing instructions, inventory based on the sales predictions of the plurality of SKUs that are located in the predictive subset of the feature matrix.

9. The system of claim 8 wherein:
creating the training matrix of the sales matrix comprises:
   for each row in the sales matrix, marking a row of the sales matrix when there are greater than a threshold number of non-zero sales data for the row of the sales matrix; and
   creating the training matrix from all marked rows of the sales matrix; and
dividing the feature matrix, as stored in the non-transitory computer readable media, into the training subset of the feature matrix and the predictive subset of the feature matrix, based on the sales matrix, comprises:
   creating the training subset of the feature matrix by:
     matching at least one SKU of the training matrix with a row in the feature matrix; and
     placing the at least one SKU, as matched, in the training subset of the feature matrix; and
   creating the predictive subset of the feature matrix by placing each SKU in the feature matrix that is not in the training subset of the feature matrix into the predictive subset of the feature matrix.

10. The system of claim 8 wherein:
decomposing the training subset of the feature matrix into the scores matrix comprises:
   decomposing the training subset of the feature matrix into the scores matrix and a loading matrix;
   the scores matrix is configured to have a maximized variance; and the scores matrix comprises the at least one respective weight for the at least one respective feature in the feature information in the training subset of the feature matrix.

11. The system of claim 8 wherein:
the scores matrix is configured to have a maximized correlation with the sales matrix.

12. The system of claim 8 wherein:
using the one or more weights of the at least one respective weight of the training subset of the feature matrix, as stored in the non-transitory computer-readable media, to create the sales predictions for the groups of the similar SKUs of the plurality of SKUs that are located in the predictive subset of the feature matrix comprises:
  using the one or more weights of the at least one respective weight of the training subset of the feature matrix, as stored in the non-transitory computer-readable media, to determine the one or more weights of the at least one respective weight for the predictive subset of the feature matrix;
  using the one or more weights of the at least one respective weight for the predictive subset of the feature matrix, as stored in the non-transitory computer-readable media, to find the similar SKUs in the training subset of the feature matrix; and
  using sales data from the sales matrix for the similar SKUs to predict sales of the similar SKUs.

13. The system of claim 8 wherein:
receiving the feature matrix comprises:
  receiving data regarding the plurality of SKUs;
  placing a respective unique identifier for each SKU of the feature matrix in the rows of the feature matrix; and
  placing semantic information corresponding to each SKU of the feature matrix in columns of the feature matrix; and
receiving the sales matrix comprises:
  receiving data regarding the plurality of SKUs;
  placing a respective unique identifier for each SKU of the sales matrix in the rows of the sales matrix; and
  placing sales information corresponding to each SKU of the sales matrix in columns of the sales matrix.

14. The system of claim 13 wherein:
each row in the feature matrix has a corresponding row in the sales matrix.

15. The method of claim 2, wherein:
the training subset of the feature matrix comprises the feature information for at least one SKU of the plurality of SKUs having greater than the threshold number of non-zero sales data; and
the predictive subset of the feature matrix comprises the feature information for at least one SKU of the plurality of SKUs having less than the threshold number of non-zero sales data.

16. The system of claim 9, wherein:
the training subset of the feature matrix comprises the feature information for at least one SKU of the plurality of SKUs having greater than the threshold number of non-zero sales data; and
the predictive subset of the feature matrix comprises the feature information for at least one SKU of the plurality of SKUs having less than the threshold number of non-zero sales data.

17. The method of claim 1, wherein the groups of the similar SKUs of the plurality of SKUs located in the predictive subset of the feature matrix comprise SKUs having no previous sales information.

18. The method of claim 1, wherein the sales predictions are created for gaps in the respective sale information for the groups of the similar SKUs of the plurality of SKUs located in the predictive subset of the feature matrix.

19. The system of claim 8, wherein the groups of the similar SKUs of the plurality of SKUs located in the predictive subset of the feature matrix comprise SKUs having no previous sales information.

20. The system of claim 8, wherein the sales predictions are created for gaps in the respective sale information for the groups of the similar SKUs of the plurality of SKUs located in the predictive subset of the feature matrix.

21. The method of claim 1, wherein the respective sale information about the respective one of the plurality of SKUs comprises a ranked vector.

22. The system of claim 8, wherein the respective sale information about the respective one of the plurality of SKUs comprises a ranked vector.

* * * * *